United States Patent
Miwa

(10) Patent No.: US 7,276,181 B2
(45) Date of Patent: Oct. 2, 2007

(54) METHOD FOR PREPARING DECORATIVE GLASS USING GLASS ETCHING COMPOSITION

(76) Inventor: Hiroshi Miwa, 3-3-704, Hara 4-chome, Sawara-ku, Fukuoka-shi, Fukuoka (JP) 814-0022

( * ) Notice: Subject to any disclaimer, the term of this patent is extended or adjusted under 35 U.S.C. 154(b) by 194 days.

(21) Appl. No.: 10/465,966

(22) PCT Filed: Dec. 25, 2001

(86) PCT No.: PCT/JP01/11408

§ 371 (c)(1),
(2), (4) Date: Jun. 27, 2003

(87) PCT Pub. No.: WO02/053508

PCT Pub. Date: Jul. 11, 2002

(65) Prior Publication Data

US 2004/0055994 A1    Mar. 25, 2004

(30) Foreign Application Priority Data

Dec. 27, 2000  (JP) .............................. 2000-396498
Sep. 28, 2001  (JP) .............................. 2001-299482

(51) Int. Cl.
*C09K 13/08*     (2006.01)
*B44C 1/22*      (2006.01)

(52) U.S. Cl. .................. 252/79.3; 252/79.1; 216/28; 216/31; 216/97; 216/98; 216/109; 65/31

(58) Field of Classification Search .................. 216/28, 216/31, 97, 109, 98; 252/79.1, 79.3; 65/31
See application file for complete search history.

(56) References Cited

U.S. PATENT DOCUMENTS

| | | | | | |
|---|---|---|---|---|---|
| 1,471,466 | A | * | 10/1923 | Hageman et al. | 252/79.1 |
| 2,970,928 | A | * | 2/1961 | Nickerson | 313/116 |
| 4,055,458 | A | * | 10/1977 | Niederprum et al. | 216/97 |
| 4,781,792 | A | * | 11/1988 | Hogan | 216/36 |
| 4,944,986 | A | * | 7/1990 | Zuel | 428/156 |
| 4,985,115 | A | * | 1/1991 | De Rossett, Jr. | 216/54 |
| 5,281,350 | A | * | 1/1994 | Gimm et al. | 252/79.2 |
| 5,804,317 | A | | 9/1998 | Charrue | |
| 6,042,739 | A | * | 3/2000 | Itoh | 216/96 |
| 6,254,796 | B1 | | 7/2001 | Rath et al. | |
| 6,476,093 | B1 | * | 11/2002 | Araki et al. | 522/83 |
| 6,807,824 | B1 | * | 10/2004 | Miwa | 65/31 |

FOREIGN PATENT DOCUMENTS

| | | |
|---|---|---|
| JP | 111479 | 7/1935 |
| JP | 122931 | 12/1937 |
| JP | 123794 | 2/1938 |
| JP | 135558 | 3/1940 |
| JP | 48-68613 | 9/1973 |
| JP | 54-127425 | 10/1979 |
| JP | 63-315539 | 12/1988 |
| JP | 06-227842 | 8/1994 |

* cited by examiner

*Primary Examiner*—Shamim Ahmed
(74) *Attorney, Agent, or Firm*—Jordan and Hamburg LLP

(57) ABSTRACT

A method for preparing a decorative glass using a glass etching composition, wherein a frosting of elaborate patterns and designs is applied on the surface of the glass having an arbitrary shape, such a plane, a curved plane or a tube, by utilizing the silk-screen process or the like, using a glass etching composition characterized as comprising 1 to 20 w/v % (preferably, 2 to 5 w/v %) of a fluoride, 20 to 80 v/v % (preferably, 20 to 50 v/v %) of water and 20 to 80 v/v % (preferably, 50 to 80 v/v %) of an organic solvent miscible with water or another glass etching composition comprising the former composition and an additive. The glass etching composition is free from the problems of the danger to a human body and environmental pollution.

15 Claims, No Drawings

METHOD FOR PREPARING DECORATIVE GLASS USING GLASS ETCHING COMPOSITION

TECHNICAL FIELD

The present invention relates to a glass etching composition and a frosting process for frosting the surface of a glass having a plane, a curved plane, a tube or any other arbitrary shape, by using the glass etching composition having a relatively low concentration of a fluoride and containing no strong acid such as fluoric acid or the like so as to be utilizable for a silk screen printing process or other printing processes.

BACKGROUND TECHNOLOGY

The most suitable method for forming a frosted glass having complex patterns, designs and so on by applying a frosting process on the surface of the glass and preparing the same products on a large scale is a silk screen printing method using a glass etching composition. The silk screen printing method for use with the glass etching composition may include a process comprising preparing a printing copy by using a silk screen, printing the printing copy on the surface of a glass with an ink, frosting the surface of the glass with a glass etching composition by utilizing the ink as a masking agent, and removing the ink from the surface thereof or a process comprising preparing a pattern using a silk screen and printing the pattern with a glass etching composition directly on the surface of a glass to thereby frosting the surface thereof. The most representative glass etching composition which has hitherto been used for frosting the surface of a glass contains fluoric acid, sulfuric acid or the like. These glass etching compositions, however, may have the danger of causing problems very hazardous to the human body and environmental pollution. Further, these glass etching compositions cannot be used for silk screen printing methods and other printing methods because they may attack a printing ink rendering them useless as a masking agent as well as damage a printing copy itself. Moreover, they suffer from the drawbacks that they have a high risk upon using for printing due to a high concentration of fluoric acid or sulfuric acid and that they cannot be used in a simple and daily way and their usage is limited to a special field.

The present invention has been accomplished in order to solve the drawbacks of the prior art technologies by using a glass etching composition and a process for frosting the surface of a glass by using the glass etching composition.

DISCLOSURE OF THE INVENTION

The present invention provides a glass etching composition comprising a liquid composition containing from 1 to 20 w/v %, preferably from 3 to 8 w/v %, of a fluoride, from 20 to 80 v/v %, preferably from 20 to 50 v/v %, of water, and from 20 to 80 v/v %, preferably from 50 to 80 v/v %, of an organic solvent miscible with water, to which at least one selected from the group consisting of an ointment substrate member, such as a hydrophilic ointment, a water-absorbable ointment, a hydrogel ointment, liogel ointment and the like, and a compound constituting the ointment substrate member is added.

The present invention further provides a method for preparing a decorative glass characterized by frosting the surface of a glass with the glass etching composition.

In addition, the present invention has the features as will be described below:

(1) To provide a glass etching composition further containing sucrose as a stabilizer in addition to each of the compositions as described above;

(2) To provide a glass etching composition further containing a surfactant in addition to each of the compositions as described above;

(3) To provide a glass etching composition further containing at least one compound selected from the group consisting of an organic acid, such as acetic acid, citric acid, malic acid, succinic acid and so on, and an inorganic acid, such as phosphoric acid, hydrochloric acid, sulfuric acid, nitric acid and so on, and a buffer thereof, in addition to each of the compositions as described above;

(4) To provide a glass etching composition colored with a dye, comprising each of the compositions as described above;

(5) To provide a glass etching composition further containing, as the fluoride, at least one compound selected from the group consisting of sodium fluoride, potassium fluoride, ammonium fluoride, sodium bifluoride, potassium bifluoride, ammonium bifluoride, ammonium borofluoride and ammonium silicofluoride, in addition to each of the compositions as described above;

(6) To provide a glass etching composition further containing, as water, tap water, ion exchange water, distilled water, ground water, spring water and filtrate water and a mixture of two or more, in addition to each of the compositions as described above;

(7) To provide a glass etching composition further containing, as the organic solvent miscible with water, at least one compound selected from the group consisting of glycerin, a glycol, such as methyl glycol, ethyl glycol, methylene glycol, ethylene glycol, propylene glycol, dimethylene glycol, diethylene glycol, dipropylene glycol, polymethylene glycol, polyethylene glycol and so on, a glycol ether, such as ethylene glycol monomethyl ether, ethylene glycol monoethyl ether, diethylene glycol monomethyl ether, diethylene glycol monoethyl ether, diethylene glycol monoisopropyl ether, diethylene glycol monobutyl ether, dipropylene glycol monomethyl ether, dipropylene glycol monoethyl ether, dipropylene glycol monoisoprpyl ether, dipropylene glycol monobutyl ether and so on, and an alcohol, such as methyl alcohol, ethyl alcohol, n-propyl alcohol, isopropyl alcohol, n-butyl alcohol, isobutyl alcohol, 1,2-ethane diol, 1,2-propane diol, 1,3-propane diol, 1,4-butane diol, 1,2,3-propane triol, 1,2,6-hexane triol, sorbitol and the like; in addition to each of the compositions as described above;

(8) To provide a glass etching composition further containing, as the surfactant, at least one compound selected from the group consisting of an anionic surfactant, such as dodecylbenzene sodium sulfonate, an alkylbenzene sodium sulfonate, lignin calcium sulfonate, a perfluoroalkyl sulfonate, a perfluoroalkyl carboxylate, a perfuloroalkyl phosphate and so on, a non-ionic surfactant, such as polyoxyethylene acetyl ether, polyoxyethylene lauryl ether, polyoxyethylene oleyl ether, polyoxyethylene stearyl ether, a polyoxyethylene alkyl ether, polyoxyethylene octylphenyl ether, polyoxyethylene nonylphenyl ether, sorbitan laurate, sorbitan palmitate, sorbitan oleate, sorbitan stearate, polyoxyethylene sorbitan monolaurate, polyoxyethylene sorbitan monopalmitate, polyoxyethylene sorbitan monooleate, polyoxyethylene sorbitan monostearte and so on, an ampholytic surfactant, such as a dimethylalkyl betaine, an alkyl glycine, amide betaine, imidazoline, a perfluoroalkylaminosulfonate, a perfluoroalkyl betaine and so on, and a cationic surfactant, such as octadecyldimethylbenzylammonium chloride, an alkyldimethylbenzylammonium chloride, tetradecyldimethylbenzylammonium chloride, dioleyldimethylammonium chloride, octadecyltrimethylammonium chloride, an alkyltrimethylammonium chloride, dodecyltrimethylammonium chloride, hexadecyltrimethylammonium chloride, octadecylamine actate, tetradecylamine acetate, a perfluoroalkyltrimethylammonium salt, a perfluoroalkyl quaternary ammonium salt and so on;

(9) To provide a frosting method for frosting the surface of a glass characterized by rinsing the surface of the glass with a rinsing liquid, wiping the rinsing liquid out thoroughly, blocking a portion of the surface of the glass unnecessary for etching by masking when needed, subjecting the surface of the glass to etching with any one of the glass etching compositions by immersing the glass in the composition or by coating the surface of the glass therewith by means of a writing brush or a coating brush or squeezing the composition onto the surface thereof, and rinsing the surface of the glass again to remove the glass etching composition remaining on the surface of the glass;

(10) To provide a frosting method for frosting the surface of a glass by filling a tube, a pall-point pen, a signing pen, a marker pen, a felt pen, a brush pen, a container provided with a writing brush or a coating brush or with a spongy matter at its one end, an air gun spray device, a hand spray device, an aerosol device and other spraying device with each of the compositions and coating or spraying the surface of the glass therewith;

(11) To provide a frosting method for frosting the surface of a glass by coating a soft film or sheet with any one of the glass etching compositions, superimposing the coated films or sheets to form a sheet-like composite member, and bringing the sheet-like composite member in the form of a sheet or a roll into direct contact with the surface of the glass through a pattern film;

(12) To provide a frosting method for frosting the surface of a glass characterized by directly etching the surface of the glass with the glass etching composition by any of the frosting methods as described above including rinsing the surface of the glass with the rinsing liquid, removing the rinsing liquid thoroughly from the surface of the glass and blocking the portion of the surface of the surface thereof unnecessary for etching by masking when needed, by coating the glass with the composition, bringing the composition into direct contact to the surface of the glass or spraying the surface of the glass therewith, and rinsing the surface of the glass again to remove the composition remaining on the surface thereof;

(13) To provide a frosting method for frosting the surface of a glass using, as the rinsing liquid, water, a soap, a household detergent or any other rinsing agent; and

(14) To provide a frosting method for frosting the surface of a glass, wherein the masking is carried out by a process using an oily pen or an oily paint, a resin paint, an acrylic paint, a masking tape, a seal, an adhesive sheet, a transcription sheet, ultraviolet curable resin or ultraviolet curable resin film, or a photoresist technique, a silk screen printing technique or any other printing technique.

BEST MODES FOR CARRYING OUT THE INVENTION

The present invention will be described in more detail by way of examples, but it is to be understood that the present invention is not construed in any respect as being limited to the examples as will be described hereinbelow.

EXAMPLE 1

To 1 part of a liquid solution containing 3 to 30 w/v % of ammonium bifluoride was added Fast Green FCF (Food Green Dye #3), and the green-colored liquid solution was then mixed with 1 to 4 parts of propylene glycol, ethylene glycol, glycerin or polyethylene glycol 400 (polyethylene glycol having an average molecular weight of approximately 400) or a mixture thereof to yield a glass etching composition. The concentration of the ammonium bifluoride in the resulting glass etching compositions ranged from 6 to 15 w/v %, respectively, with respect to the whole composition.

A glass plate, a glass cup and a mirror was each cleaned with tap water and water left on the surface was wiped out. After a necessary portion on the surface of the glass was masked with a blue-colored oily pen, the glass was then immersed in the glass etching composition as prepared above for 5 to 20 minutes. Thereafter, each of the glass articles was taken out from the composition and then washed with tap water. As a result, there was obtained the glass where the unmasked surface portion was frosted.

It was found that the extent of opaqueness on the frosted surface of the glass becomes darker and the period of time for immersion becomes shorter, dependent upon the concentration of ammonium bifluoride, and further that the immersion in the glass etching composition containing from 3 to 5 w/v % of ammonium bifluoride for 15 minutes can provide a better frosted surface of the glass in terms of the extent and irregularity of opaqueness.

It was also found that a volume ratio of the glycol, glycerin and polyethylene glycol 400 with respect to the liquid solution in the range of approximately from 2 to 3 could provide a better extent of opaqueness and uniformity in opaqueness on the frosted surface of the glass.

On the other hand, it was found that an increase in the volume ratio of glycerin and polyethylene glycol 400 with respect to the liquid solution can reduce the extent of opaqueness on the frosted surface of the glass.

EXAMPLE 2

To 1 part of a liquid solution containing from 9 to 15 w/v % of ammonium bifluoride and from 0 to 15 w/v % of sucrose or sorbitol was added Fast Green FCF, and the resulting green-colored liquid solution was mixed with 2 parts of propylene glycol to yield a glass etching composition. The resulting glass etching composition contained the ammonium bifluoride in the concentration of from 3 to 5 w/v %, respectively, with respect to the whole composition.

A glass plate was washed with tap water and water left on the surface was wiped out. Thereafter, a necessary portion on the surface of the glass plate was masked with an oily blue pen followed by immersing the glass plate in the above glass etching composition for 5 to 15 minutes. The glass plate was then taken out from the glass etching composition and washed with tap water again. As a result, it was found that the unmasked surface portion on the glass plate was frosted.

It was further found that the higher the concentration of sucrose and sorbitol for the above glass etching composition becomes, the higher the extent of opaqueness on the frosted surface of the glass plate becomes.

It can be noted, however, that other volume ratios of propylene glycol with respect to the liquid solution cannot give uniform results because they may sometimes cause a lighter extent of opaqueness on the frosted surface of the glass plate in a way opposite to the above results obtained in this example.

EXAMPLE 3

To 1 part of a liquid solution containing from 9 to 15 w/v % of ammonium bifluoride and from 0 to 3 w/v % or from 0 to 3 v/v % of polyoxyethylene octylphenyl ether, polyoxyethylene nonylphenyl ether, polyoxyethylene sorbitan monolaurate, lignin calcium sulfonate or dodecylbenzene sodium sulfonate or a mixture thereof, as a surfactant, was added Fast Green FCF, and the resulting green-colored liquid solution was mixed with 2 parts of propylene glycol to yield a glass etching composition. The resulting glass etching composition contained the ammonium bifluoride in the concentration of from 3 to 5 w/v %, respectively, with respect to the whole composition.

A glass plate was washed with tap water and water left on the surface was wiped out. Thereafter, a necessary portion on the surface of the glass plate was masked with an oily blue pen followed by immersing the glass plate in the above glass etching composition for 5 to 15 minutes. The glass plate was then taken out from the glass etching composition and washed with tap water again, yielding a frosted glass plate in which the unmasked surface portion thereof was frosted.

It was also found that the surfactants did not affect so much the extent of opaqueness on the frosted surface of the glass plate and they could facilitate a uniform attachment of the glass etching composition on the surface of the glass plate. It was further found that the extent of opaqueness on the frosted surface of the glass plate became darker and the period of time for immersion became shorter in accordance with the concentration of ammonium bifluoride, but that the glass surface was partially in a state as if a surface were polished with an acid or that roughness was found more on the surface of the frosted glass. The addition of the surfactant, however, could produce the tendency to improve these states to some extent.

EXAMPLE 4

To 1 part of a liquid solution containing from 9 to 15 w/v % of ammonium bifluoride was added Brilliant Blue FCF (Food Blue Dye #1), and the resulting blue-colored liquid solution was mixed with 2 parts of propylene glycol. To the mixture was added 1 to 10 w/v % of hydroxypropyl cellulose, and the resulting mixture was stirred to yield a glass etching composition in the form of a uniform gel. The resulting glass etching composition contained the ammonium bifluoride in the concentration of from 3 to 5 w/v %, respectively, with respect to the whole composition.

A glass plate, a glass cup and a mirror were each washed with tap water and water left on the surface was wiped out. Thereafter, a necessary portion on the surface of each of the glass articles was masked with an oily blue pen, followed by coating it with the above glass etching composition by means of a brush or by squeezing it from a tube and then allowing it to stand for 5 to 10 minutes. Then, the glass plate, the glass cup and the mirror was each washed with tap water again, each yielding a frosted glass product in which the unmasked surface portion thereof was frosted.

It was found herein that an appropriate amount of hydroxypropyl cellulose was in the range of from approximately 1 to 4 w/v % with respect to the total amount of the composition when coated with the brush and that it was approximately 4 w/v % or more with respect to the total amount thereof when coated by squeezing from the tube. Although an average viscosity of hydroxypropyl cellulose is not limited to a particular one, it is preferred to use hydroxylpropyl cellulose having an average viscosity ranging from approximately 150 to 400 mps (in 2% aqueous solution, 20° C.) from the viewpoint of the extent of opaqueness on the frosted glass surface and easiness of handling.

In the event where some other gelling agents were used, amounts considerably larger than that of hydroxypropyl cellulose were required in some cases in order to form a uniform gel-like composition. In some cases, the extent of opaqueness of the frosted glass surface became lower or a uniform extent of opaqueness became difficult to achieve.

EXAMPLE 5

To 1 part of a liquid solution containing from 3 to 30 w/v % of ammonium bifluoride and from 0 to 10 v/v % of hydrochloric acid or nitric acid was added Fast Green FCF, and the resulting green-colored liquid solution was mixed with from 1 to 4 parts of propylene glycol, ethylene glycol, glycerin or polyethylene glycol 400 (a polyethylene glycol having an average molecular weight of approximately 400), respectively, to yield a glass etching composition. The resulting glass etching composition contained the ammonium bifluoride in the concentration of from 0.6 to 15 w/v %, respectively, with respect to the total amount of the composition.

A glass plate, a glass cup and a mirror were each washed with tap water and water left on the surface was wiped out. Thereafter, a necessary portion on the surface of each glass matter was masked with an oily blue pen, followed by immersing it in the above glass etching composition for 5 to 20 minutes. Each of the glass articles was then washed with tap water again, yielding a frosted glass product in which the unmasked surface portion thereof was frosted.

It was found herein that the extent of opaqueness on the frosted glass surface became darker and the period of time for immersion became shorter in accordance with the concentration of ammonium bifluoride. It was further found, however, that a better frosted surface on the glass could be achieved when the surface of the glass was frosted with the composition containing ammounium bifluoride in the concentration of 3 to 8 w/v % and hydrochloric acid or sulfuric acid in the concentration of 0.5 to 2 v/v %. Moreover, it was found that the addition of the glycols, glycerin and polyethylene glycol 400 in the volume ratio of from 2 to 3 with respect to the aqueous solution was preferred in terms of the extent and uniformity of opaqueness on the frosted glass surface. In the event where the volume ratio of glycerin and polyethylene glycol 400 increased, opaqueness on the frosted glass surface became reduced.

EXAMPLE 6

To 1 part of a liquid solution containing from 9 to 24 w/v % of ammonium fluoride, from 3 to 6 v/v % of hydrochloric acid or nitric acid and from 0 to 3 v/v % or from 0 to 3 w/v % of polyoxyethylene octylphenyl ether, polyoxyethylene nonylphenyl ether, polyoxyethylene sorbitan monolaurate, lignin calcium sulfonate or dodecylbenzene sodium sulfonate or a mixture thereof, as a surfactant, was added Fast Green FCF to yield a green-colored liquid solution. To the resulting green-colored liquid solution were added 2 parts of propylene glycol, and the solution was admixed yielding a glass etching composition. The resulting glass etching composition contained the ammonium fluoride in the concentration of from 3 to 8 w/v %, respectively, with respect to the entire amount of the composition.

A glass plate was washed with tap water and the water left on the surface of the glass was wiped out. Thereafter, some necessary portions on the surface of the glass were masked with an oily blue pen and the glass was immersed in the above glass etching composition for 5 to 15 minutes. The glass plate was then washed with tap water again yielding a glass plate with the unmasked portions on the surface thereof frosted.

It was found that the above surfactants did not affect the extent of opaqueness on the surface of the glass to a great extent yet they facilitated a uniform attachment of the glass etching composition to the surface thereof. The similar results were given by the other surfactants although the opaqueness varied with the surfactants to some extent. It was also found that the extent of opaqueness on the surface of the glass became darker and the periods of time for immersion became shorter in accordance with the concentrations of ammonium fluoride, yet there were some occasions that the surface of the glass became partially in a state as if it were polished with an acid, or roughness was found more on the surface of the frosted glass. Further, the addition of the surfactants produced the tendency of improving the above states to some extent.

EXAMPLE 7

To 1 part of an aqueous solution containing from 9 to 24 w/v % of ammonium fluoride and from 3 to 6 v/v % of hydrochloric acid or nitric acid, Brilliant Blue FCF was added to give a blue-colored aqueous solution, and 2 parts of propylene glycol was added to the blue-colored aqueous solution. Further, from 1 to 10 w/v % of hydroxypropyl cellulose with respect to the total amount of the solution was added and mixed well to yield a glass etching composition in a uniform gel form. The resulting glass etching composition had ammonium fluoride at the rate of from 3 to 8 w/v %, respectively, with respect to the total amount of the composition.

A glass plate, a glass cup and a mirror were each washed with tap water and the water left thereon was wiped out. A necessary portion on the surface of each of them was masked with a blue-colored oily pen, and the surface of each of them was coated with the above glass etching composition by means of a brush or by squeezing the above glass etching composition thereonto from a tube followed by allowing them to stand for 5 to 10 minutes. Thereafter, the glass plate, the glass cup and the mirror were each washed with tap water again yielding a glass product with the unmasked portions frosted.

It was found that the preferred amount of hydroxypropyl cellulose was in the range of from 1 to 4 w/v % with respect to the total amount of the composition when coated with a brush and approximately 4 w/v % or more with respect thereto when coated by squeezing the composition from a tube. Although an average viscosity of hydroxypropyl cellulose is not limited to a particular one, an average viscosity of from approximately 150 to 400 mps (in 2% aqueous solution, 20° C.) is preferred in terms of opaqueness and ease of handling. Some other gelling agents, however, require amounts larger than hydroxypropyl cellulose in order to form a uniform gel, and they reduced the extent of opaqueness or caused the difficulty in obtaining a uniform frosted surface of a glass product in some cases.

EXAMPLE 8

To 1 part of an aqueous solution containing from 3 to 30 w/v % of a mixture of ammonium bifluoride and ammonium fluoride and from 0 to 10 v/v % of hydrochloric acid or nitric acid, Fast Green FCF was added to give a green-colored aqueous solution, and from 1 to 4 parts of propylene glycol was added to the blue-colored aqueous solution yielding a glass etching composition. The resulting glass etching composition had the fluorides at the rate of from 0.6 to 15 w/v %, respectively, with respect to the entire amount of the composition.

A glass plate, a glass cup and a mirror were each washed with tap water and the water left thereon was wiped out. A necessary portion on the surface of each of them was masked with a blue-colored oily pen, and the surface of each of them was coated with the above glass etching composition by means of a brush or by squeezing the above glass etching composition thereon from a tube, followed by allowing them to stand for 5 to 20 minutes. Thereafter, each of the glass plate, the glass cup and the mirror was washed with tap water again yielding a glass product with the unmasked portions frosted.

It was found that the preferred amount of the fluorides was in the range of from 3 to 8 w/v % with respect to the entire amount of the composition and the preferred amount of hydrochloric acid or nitric acid was in the range of from 0 to approximately 2 v/v % with respect thereto, in order to produce a good frosted surface of the glass articles. It was also found that a better extent of opaqueness and uniformity was produced on the frosted surface of the glass article when the volume rate of propylene glycol with respect to the aqueous solution was set to be from approximately 2 to 3.

EXAMPLE 9

To 1 part of an aqueous solution containing from 3 to 30 w/v % of a mixture of ammonium fluoride and ammonium bifluoride and from 0 to 10 v/v % of hydrochloric acid or nitric acid, Brilliant Blue FCF was added to give a blue-colored aqueous solution, and 2 parts of propylene glycol were added to the blue-colored aqueous solution. Further, from 1 to 10 w/v % of hydroxypropyl cellulose with respect to the entire amount of the solution was added and mixed well to yield a glass etching composition in a uniform gel form. The resulting glass etching composition had ammonium fluoride at the rate of from 1 to 10 w/v %, respectively, with respect to the entire amount of the composition.

A glass plate, a glass cup and a mirror were each washed with tap water and the water left thereon was wiped out. A necessary portion on the surface of each of the glass articles was masked with a blue-colored oily pen, and the surface of each of the glass articles was coated with the above glass etching composition by means of a brush or by squeezing the above glass etching composition thereon from a tube, followed by allowing them to stand for 5 to 10 minutes. Thereafter, each of the glass article was washed with tap water again yielding a glass product with the unmasked portions frosted.

It was found that the preferred amount of hydroxypropyl cellulose was in the range of from 1 to 4 w/v % with respect to the entire amount of the composition when coated with a brush and approximately 4 w/v % or more with respect thereto when coated by squeezing the composition from a tube. Although an average viscosity of hydroxypropyl cellulose is not limited to a particular one, an average viscosity of from approximately 150 to 400 mps (in 2% aqueous solution, 20° C.) is preferred in terms of opaqueness and ease of handling. It was further found that some other gelling agents, however, required amounts larger than hydroxypropyl cellulose in order to form a uniform gel and that they reduced the extent of opaqueness or caused the difficulty in obtaining a uniform frosted surface of a glass product in some cases.

EXAMPLE 10

To at least one compound selected from ammonium fluoride, ammonium bifluoride and sodium bifluoride was added water containing from 0 to 10 v/v % of hydrochloric acid or nitric acid, from 1 to 2 parts of propylene glycol and from 2 to 8 parts of at least one ointment substrate member selected from hydrophilic ointment, hydrogel ointment and liogel ointment, and the mixture was mixed well to yield a glass etching composition in a uniform cream form. The glass etching composition was adjusted to contain the fluoride or fluorides at the rate of from 5 to 20 w/v %, respectively, with respect to the entire amount of the composition.

A glass plate, a glass cup and a mirror were each washed with tap water and the water left thereon was wiped out. A necessary portion on the surface of each of the glass articles was masked with a blue-colored oily pen, and the surface of each of the glass articles was coated with the above glass etching composition by means of a brush, followed by allowing them to stand for 5 to 15 minutes. Thereafter, the glass articles were each washed with tap water again yielding the glass plate, glass cup and mirror, each with the unmasked portions frosted.

EXAMPLE 11

An adhesive sheet was peeled off from a base paper and affixed to a glass plate, and patterns, designs, characters, or the like were transferred onto the adhesive sheet affixed to the glass plate through a carbon paper or the like. Thereafter, the patterns, designs, characters and so on were cut off with a cutter. Alternatively, an adhesive sheet with desired patterns, designs, characters and so on previously cut away was affixed to a glass plate. The glass plate with the adhesive sheet attached thereto was then coated with one of the above glass etching compositions by means of a brush and allowed to stand for 15 minutes. The glass etching composition was then washed out with tap water and the adhesive sheet was peeled off, yielding the glass plate with the desired patterns, designs, characters and so on frosted thereon.

EXAMPLE 12

Patterns, designs, characters or the like were copied with a copying machine or printed out with a laser printer on a surface of a pikua (in Japanese) sheet with lines drawn with a white ink in such a manner that white and black colors were to be inverted. A portion with no image present thereon was rubbed with alcohol to remove a white film. Thereafter, a re-tack sheet was peeled off from a base paper and an adhesive face of the sheet was affixed to the printed surface of the sheet securely by pressing the sheets with a spatula. The back surface of the pikua (in Japanese) sheet was coated with water by means of a brush and pressed with a spatula lightly over the entire area in about 1 minute or more. The sheet was then peeled off, and the back surface of the sheet at the corresponding image portion was coated again with water by means of a brush and water present on the surface of the sheet was wiped out with a tissue paper, followed by allowing the sheet to stand at room temperature to dryness. After dried well, an image on the re-tack sheet was attached to the surface of a glass plate and rubbed thereonto from the top with strong pressure with a spatula and the re-tack sheet was peeled off slowly by pulling just beside. A portion where a toner was blurred or hollow was masked with an oily pen.

The glass plate was then brushed with the above glass etching composition and allowed to stand for 15 minutes. The glass etching composition was washed out with tap water and the toner was wiped out with a lacquer thinner, yielding a glass plate with the desired patterns, designs, characters and so on frosted.

EXAMPLE 13

A negative or positive block copy film was prepared from a desired photograph, picture, pattern, design, character or the like. Alternatively, a block copy film or a lith film having a high contrast, a half tone or the like was prepared by means of digital processing with a computer or by means of photolithography. A glass plate was coated with a ultraviolet curable resin solution or covered with a ultraviolet curable resin sheet, and the block copy film or the lith film having a translucent portion and a non-translucent portion was attached securely to the glass plate. The glass plate was irradiated with ultraviolet rays by a ultraviolet lamp from top and exposed to light. The resin left uncured on the non-translucent portion of the glass plate was washed out, and the back surface was masked. The glass plate was then immersed in the glass etching composition and allowed to stand for 15 minutes, followed by washing the composition out with tap water. The cured resin was then removed to yield a glass plate with a desired photograph, picture, pattern, design, character or the like frosted.

EXAMPLE 14

A negative or positive block copy film was prepared from a desired photograph, picture, pattern, design, character or the like. Alternatively, a block copy film or a lith film having a high contrast, a half tone or the like was prepared by means of digital processing with a computer or by means of photolithography. A copy for a silk screen was prepared from the block copy film or the lith film having a translucent portion and a non-translucent portion, and a glass plate was masked by printing with a printing ink in such a manner that the printed portion was not frosted by allowingl it to fail to come into contact with the glass etching composition. After the back face of the glass plate was masked, the glass plate was immersed in the glass etching composition for 15 minutes. The glass etching composition was then washed out with tap water and the printing ink was wiped out with a lacquer thinner, then yielding the glass plate with a desired photograph, picture, pattern, design, character or the like frosted.

EXAMPLE 15

A negative or positive block copy film was prepared from a desired photograph, picture, pattern, design, character or the like. Alternatively, a block copy film or a lith film having a high contrast, a half tone or the like was prepared by means of digital processing with a computer or by means of photolithography. A copy for a silk screen was prepared from the block copy film or the lith film having a translucent portion and a non-translucent portion and attached securely to a glass plate. On the surface of the glass plate was coated uniformly with the glass etching composition by means of a squeegee so as to be as thick as 1 to 2 mm, and the glass plate was allowed to stand for 10 minutes. After the glass etching composition was washed out with tap water, there was obtained the glass plate with a desired photograph, picture, pattern, design, character or the like frosted.

INDUSTRAIL APPLICABILITY

As described above, the present invention provides the glass etching composition and a frosting method using the glass etching composition and can present the effects as will be described hereinafter.

(1) The subject matter according to each of the first, fourth, sixth, seventh and eighth aspects of the present invention is directed to the glass etching composition to be used in the frosting method according to the present invention, which contains a very small amount of the fluoride yet does not contain fluoric acid extremely hazardous to the human body. More specifically, the glass etching composition according to the present invention is extremely safe because it is composed of ammonium bifluoride or ammonium fluoride, which can provide a frosted glass surface having the best quality, among the fluorides or combinations of the fluorides with the acids, and its concentration is as low as 4 w/v % or lower. It is further noted that the $LD_{50}$ value of the ammonium bifluoride solution in this concentration exceeds 3,000 mg/kg per mouse, when orally administered, and this value is lower at least by more than 10 times as compared with the reference standard oral $LD_{50}$ value in this country ranging from 30 to 300 mg/kg per mouse. It can further be noted that the concentration of hydrochloric acid or sulfuric acid is as low as 1 v/v % or lower upon frosting the glass with the glass etching composition in combination with ammonium bifluoride that is higher in safety. Therefore, the glass etching composition according to the present invention does not require any ventilating equipment upon handling and can be treated with bare hands and does not cause any problem even if the composition would be attached directly to the human body during a period of time when the glass is being subjected to the frosting process. On the other hand, fluorine-type glass etching compositions which have been conventionally used in this field require the use of protective tools such as a goggle and a pair of rubber gloves and the installment of ventilating equipment.

For the glass etching composition according to the present invention, the concentration of the fluoride, such as, for example, ammonium bifluoride or ammonium fluoride, can be reduced to a remarkable extent by changing a ratio of water to the organic solvent miscible with water, such as the glycols, glycerin or the like, to a ratio thoroughly different from that of the conventional glass etching compositions. Therefore, the etching action achieved by the glass etching composition according to the present invention can be performed in a very mild fashion and pits formed on the surface of the glass can be made so uniform in size and so small in shape that the frosted glass surface can provide a very good feel as if it were a plane surface of a normal translucent glass. Moreover, when the frosted surface of the glass is printed with a gold-colored or silver-colored ink or other inks having different colors, a graceful and distinct glass product can be produced without losing the luster of the inks.

The present invention can further present the advantages that the glass etching composition can be used for etching at room temperature and further the etching velocity is so mild that the desired extent of opaqueness on the surface of the glass can be achieved in an appropriate fashion by changing the etching period of time in minute unit, for example, to 5 minutes, 10 minutes, 15 minutes or 20 minutes.

Moreover, the present invention can offer the advantage that the extent of opaqueness on the surface of the glass can be achieved in an appropriate fashion by changing the concentration of the fluoride, such as, for example, ammonium bifluoride or ammonium fluoride, or a rate of water or the organic solvent miscible with water, such as, for example, glycols or glycerin, in the glass etching composition according to the present invention, or by adding other alcohols or the like thereto.

The glass etching composition according to the present invention in the form of a liquid, on the one hand, is composed of a very small amount of the fluoride, such as, for example, ammonium bifluoride or ammonium fluoride, and a glycol to be used for cosmetics and medicine, as described above. The glass etching composition according to the present invention in the form of a cream, on the other hand, contains an ointment substrate member, such as, for example, a hydrophilic ointment component, in addition to the above composition. Therefore, the glass etching composition according to the present invention can achieve the effect to solve the problems with environmental pollution and a hazard to the human body, which are one of the most significant issues caused by the fluorine-type glass etching compositions. Moreover, the creamy glass etching compositions having different viscosities can be prepared by changing the concentrations of the ointment substrate members in the glass etching composition of the present invention. In addition, the glass etching composition according to the present invention can present the effect that a high-quality frosted surface can be formed on a glass by increasing an attachment of the glass etching composition to the glass surface.

The glass etching composition according to the present invention can also be applied to a silk screen printing process or any other printing processes because it is suitable for etching a complex pattern, design, characters and the like on the surface of a glass. Therefore, a decorative glass with an elaborate design, picture or pattern frosted thereon can be produced without an experienced skill so that the frosted glasses can be reproduced in a large number. Accordingly, the glass etching composition according to the present invention can add a great industrial value because the costs for production can be reduced to a great extent.

Further, the glass etching composition according to the present invention can be masked, for example, with the oily pen, the oily paint, the resin paint or the acrylic paint or with the seal or the adhesive tape so that the present invention is provided with the effect that even an individual person can frost designs, patterns or characters on the surface of a glass with the glass etching composition in a simple and safe way. Therefore, the composition can also be used as a hobby tool.

In addition, the present invention can offer the advantage that the glass etching composition can frost designs, patterns, characters and the like on a whole area of a surface of a very thin glass, a flat or curved surface of a glass and a surface of a tubular glass or on a surface of a glass having any other arbitrary shape, which has hitherto been difficult to frost by conventional frosting processes, or on a portion of the surface thereof by masking, in a very safe and simple fashion without causing environmental pollution.

The glass etching composition according to the present inventionn can also achieve the effect of subjecting the rinsing and etching processes to a panel of a Braun tube or a semiconductor substrate.

The glass etching composition according to the present inventionn does not require any special pre-treatment and after-treatment upon frosting the surface of a glass.

Moreover, the glass etching composition according to the present inventionn has a strong anti-weathering resistance to temperature, moisture and ultraviolet rays, so that it can be used in a repeated manner. In addition, the glass etching composition can offer the advantage that it can be filtered with a special filter paper into an aqueous phase containing the fluoride and an organic phase containing the organic solvent miscible with water, so that the organic phase can be recovered while the aqueous phase containing the deteriorated fluoride is disposed of.

(2) The subject matter according to the second aspect of the present invention has the effect that sucrose can contribute to stability of the glass etching composition.

(3) The subject matter according to the third and ninth aspects of the present invention can offer the effects that the addition of the surfactant to the glass etching composition improves wetting properties due to a decrease in the surface extension action, thereby facilitating a uniform attachment of the glass etching composition onto the surface of the glass.

(4) For the subject matter according to the fifth aspect of the present invention, the glass etching composition is colored with a dye so that safety can be enhanced from the visual point of view and the color can act as a reference to disposal by dilution with water because a wide variety of dyes can be used in addition to a water-soluble dye. Moreover, a quick-drying dye or a water-resistant dye can also be added in order to color the surface of the glass as well as to etch the surface thereof.

(5) The subject matter according to the tenth aspect of the present invention can present the effect that a highly aesthetic product can be provided by frosting a desired pattern, design or the like optionally on the surface of the glass in a simple way by blocking a non-etching portion on the surface of the glass by masking, immersing the glass in the glass etching composition or coating the surface thereof with it by applying with a brush or squeegee, and then rinsing the glass.

(6) For the subject matter according to the eleventh, twelfth and thirteenth aspects of the present invention, a pattern, design or the like can be readily formed on the surface of a glass and it can be stored and managed with ease because the surface of the glass is frosted by coating the glass etching composition directly on the surface thereof with a tube, a ball-point pen, a signing pen, a marker pen, a felt pen or a brush-like pen, or a container with a writing brush, a coating brush or a spongy tool provided at its one end, which is each filled with the composition, or spraying the glass etching composition directly onto the surface thereof from a spray gun device, a hand spray device or an aerosol device, each filled with the composition, or coating the glass etching composition on a soft film or sheet, superimposing the films or sheets into a sheet-like composite member, and then bringing the sheet-like composite member into contact directly to the surface thereof.

(7) The subject matter according to the fourteenth aspect of the present invention can be provided with the effect that the glass etching composition containing the fluoride as a major component, attached to the surface of the glass, can be rinsed out with water in a simple and sure way after the surface thereof was subjected to the etching process with the glass etching composition in a liquid, gel or cream form.

(8) For the subject matter according to the fifteenth aspect of the present invention, the effect for further improving a craft-like value of the glass products can be achieved because an elaborate pattern, design and so on can be formed in a simple fashion because a portion on the surface of a glass unnecessary for etching is masked with a masking material by means of an oily pen, an oily paint, an acrylic paint, a masking tape, a seal, an adhesive sheet, a transcription sheet, ultraviolet curable resin, ultraviolet curable resin sheet or the like or a photoresist technique or an equivalent technique thereof, or silk screen printing process or any other printing process, upon etching with the glass etching composition.

The invention claimed is:

1. A glass etching composition comprising from 1 to 20 w/v % of a fluoride selected from the group consisting of sodium fluoride, potassium fluoride, ammonium fluoride, sodium bifluoride, potassium bifluoride, ammonium bifluoride, ammonium borofluoride and ammonium silicofluoride, from 20 to 80 v/v % of water selected from the group consisting of tap water, ion-exchanged water, distilled water, pure water, ground water, spring water, filtered water or a mixture thereof, from 20 to 80 v/v % of at least one organic solvent miscible with water, selected from the group consisting of glycerin, a glycol selected from methyl glycol, ethyl glycol, methylene glycol, ethylene glycol, propylene glycol, dimethylene glycol, diethylene glycol, dipropylene glycol, polymethylene glycol and polyethylene glycol, a glycol ether selected from ethylene glycol monomethyl ether, ethylene glycol monoethyl ether, diethylene glycol monomethyl ether, diethylene glycol monoethyl ether, diethylene glycol monoisopropyl ether, diethylene glycol monobutyl ether, dipropylene glycol monomethyl ether, dipropylene glycol monoethyl ether, dipropylene glycol monoisopropyl ether and dipropylene glycol monobutyl ether, and an alcohol selected from methyl alcohol, ethyl alcohol, n-propyl alcohol, isopropyl alcohol, n-butyl alcohol, isobutyl alcohol, 1,2-ethane diol, 1,2-propane diol, 1,3-propane diol, 1,4-butane diol, 1,2,3-propane triol, 1,2,6-hexane triol and sorbitol, and 1-10 v/v % of at least one inorganic acid selected from the group consisting of hydrochloric acid, sulfuric acid and nitric acid.

2. A glass etching composition as claimed in claim 1, wherein said fluoride is contained from 3 to 8 w/v %, said water is contained from 20 to 50 v/v %, said organic solvent is contained from 50 to 80 v/v % and said inorganic acid is 3 to 6 v/v %.

3. The glass etching composition as claimed in claim 1, wherein the fluoride comprises ammonium fluoride, sodium bifluoride, ammonium bifluoride or a mixture thereof.

4. The glass etching composition as claimed in claim 1, wherein said organic solvent miscible with water is at least one selected from the group consisting of glycerin, ethanol, ethylene glycol, propylene glycol and polyethylene glycol.

5. A glass etching composition as claimed in claim 1, further comprising a surfactant selected from the group consisting of an anionic surfactant selected from dodecylbenzene sodium sulfonate, an alkylbenzene sodium sulfonate, lignin calcium sulfonate, a perfluoroalkyl sulfonate, a perfluoroalkyl carboxylate and a perfuloroalkyl phosphate, a non-ionic surfactant selected from polyoxyethylene acetyl ether, polyoxyethylene lauryl ether, polyoxyethylene oleyl ether, polyoxyethylene stearyl ether, a polyoxyethylene alkyl ether, polyoxyethylene octyiphenyl ether, polyoxyethylene nonyiphenyl ether, sorbitan laurate, sorbitan palmitate, sorbitan oleate, sorbitan stearate, polyoxyethylene sorbitan monolaurate, polyoxyethylene sorbitan monopalmitate, polyoxyethylene sorbitan monooleate and polyoxyethylene sorbitan monostearate, an ampholytic surfactant selected from a dimethylalkyl betaine, an alkyl glycine, amide betaine, imidazoline, a perfluoroalkylaminosulfonate and a perfluoroalkyl betaine, and a cationic surfactant selected from octadecyldimethylbenzyl-ammonium chloride, an alkyldimethylbenzylammonium chloride, tetradecyldimethylbenzyl-ammonium chloride, dioleyldimethylammonium chloride, octadecyltrimethylammonium chloride, an alkyltrimethylanimonium chloride, dodecyltrimethylammonium chloride, hexadecyltrimethylammonium chloride, octadecylamine acetate, hexadecylamine acetate, perfluoroalkyltrimethylammonium salt and perfluoroalkyl quaternary ammonium salt.

6. A frosting method for frosting a surface of a glass comprising rinsing the surface of the glass with a rinsing liquid, removing the rinsing liquid thoroughly from the surface thereof, blocking a portion of the glass unnecessary for etching on the surface thereof by masking when needed, etching the surface thereof with the composition as claimed in claim 1 or 2 by immersing the glass in the composition or by coating the surface thereof with the composition with a writing brush or a coating brush or squeezing the composition, and rinsing the surface thereof again to remove the glass etching composition remaining on the surface thereof.

7. A frosting method for frosting the surface of a glass comprising filling a tube, a ball-point pen, a signing pen, a marker pen, a felt pen, a brush-like pen, a container with a writing brush or a coating brush or a device with spongy matter mounted at an end, an air gun spray device, a hand spray device or an aerosol device with the composition as in claim 1 or 2, and coating or spraying directly the surface of a glass therewith.

8. A frosting method for frosting a surface of a glass comprising coating a soft film or sheet with the composition as claimed in claim 1 or 2, superimposing the soft film or sheet into a composite member, and bringing the composite member in the form of a sheet or a roll into direct contact with the surface of the glass.

9. A frosting method for frosting a surface of a glass comprising rinsing the surface of the glass with a rinsing liquid, removing the rinsing liquid thoroughly from the surface of the glass and blocking the portion of the surface thereof unnecessary for etching by masking when needed, applying to the surface thereof the glass etching composition of claim 1 or 2 by means of any of: immersing the glass in the composition, coating the surface thereof with the composition with a writing brush or a coating brush or squeezing the composition, or by filling a tube, a ball-point pen, a signing pen, a marker pen, a felt pen, a brush-like pen, a container with a writing brush or a coating brush or a spongy matter mounted at one end, an air gun spray device, a hand spray device or an aerosol device with the composition and coating or spraying directly the surface of a glass therewith or by coating a soft film or sheet with the composition superimposing the soft film or sheet into a composite member, and bringing the composite member in the form of a sheet or a roll into direct contact with the surface of the glass or spraying the glass therewith to expose the surface of the glass to the composition, and rinsing the surface thereof again to remove the composition remaining on the surface.

10. The frosting method for frosting the surface of the glass as claimed in claim 9, wherein said applying of said glass etching composition is done by immersing the glass in the composition or by coating the surface thereof with the composition with a writing brush or a coating brush or squeezing the composition, and said rinsing liquid is water, a soap, a household detergent or other rinsing agents.

11. The frosting method for frosting a surface of a glass according to claim 9, wherein said masking is carried out by a process using an oily pen or an oily paint, a resin paint, an acrylic paint, a masking tape, a seal, an adhesive sheet, a transcription sheet, ultraviolet curable resin or ultraviolet curable resin film, a photoresist technique, a silk screen printing technique or any other printing technique.

12. A frosting method for frosting a surface of a glass, comprising coating the surface of the glass with a glass etching composition comprising from 1 to 20 w/v % of a fluoride selected from the group consisting of sodium fluoride, potassium fluoride, ammonium fluoride, sodium bifluoride, potassium bifluoride, ammonium bifluoride, ammonium borofluoride and animonium silicofluoride, from 20 to 80 v/v % of water selected from the group consisting of tap water, ion-exchanged water, distilled water, pure water, ground water, spring water, filtered water or a mixture thereof, from 20 to 80 v/v % of at least one organic solvent miscible with water, selected from the group consisting of glycerin, a glycol selected from methyl glycol, ethyl glycol, methylene glycol, ethylene glycol, propylene glycol, dimethylene glycol, diethylene glycol, dipropylene glycol, polymethylene glycol and polyethylene glycol, a glycol ether selected from ethylene glycol monomethyl ether, ethylene glycol monoethyl ether, diethylene glycol monomethyl ether, diethylene glycol monoethyl ether, diethylene glycol monoisopropyl ether, diethylene glycol monobutyl ether, dipropylene glycol monomethyl ether, dipropylene glycol monoethyl ether, dipropylene glycol monoisopropyl ether and dipropylene glycol monobutyl ether, and an alcohol selected from methyl alcohol, ethyl alcohol, n-propyl alcohol, isopropyl alcohol, n-butyl alcohol, isobutyl alcohol, 1,2-ethane diol, 1,2-propane diol, 1,3-propane diol, 1,4-butane diol, 1,2,3-propane triol, 1,2,6-hexane triol and sorbitol, and 1 to 10 v/v % of at least one inorganic acid selected from the group consisting of hydrochloric acid, sulfuric acid and nitric acid.

13. The frosting method as claimed in claim 12, wherein said glass etching composition comprises from 3 to 8 w/v % of the fluoride, from 20 to 50 v/v % of water, from 50 to 80 v/v % of the organic solvent miscible with water, and from 3-6 v/v % of the inorganic acid.

14. The frosting method as claimed in claim 12, wherein the fluoride comprises ammonium fluoride, sodium bifluoride, ammonium bifluoride or a mixture thereof.

15. The frosting method as claimed in claim 12, wherein said organic solvent miscible with water comprises at least one selected from the group consisting of glycerin, ethanol, ethylene glycol, propylene glycol and polyethylene glycol.

* * * * *